3,387,842
SELF-DEFENSE MANIKIN PRACTICE DEVICE
Leonard D. Edgar, 2440 Portsmouth Ave.,
Toledo, Ohio 43613
Filed Dec. 14, 1965, Ser. No. 513,775
2 Claims. (Cl. 272—76)

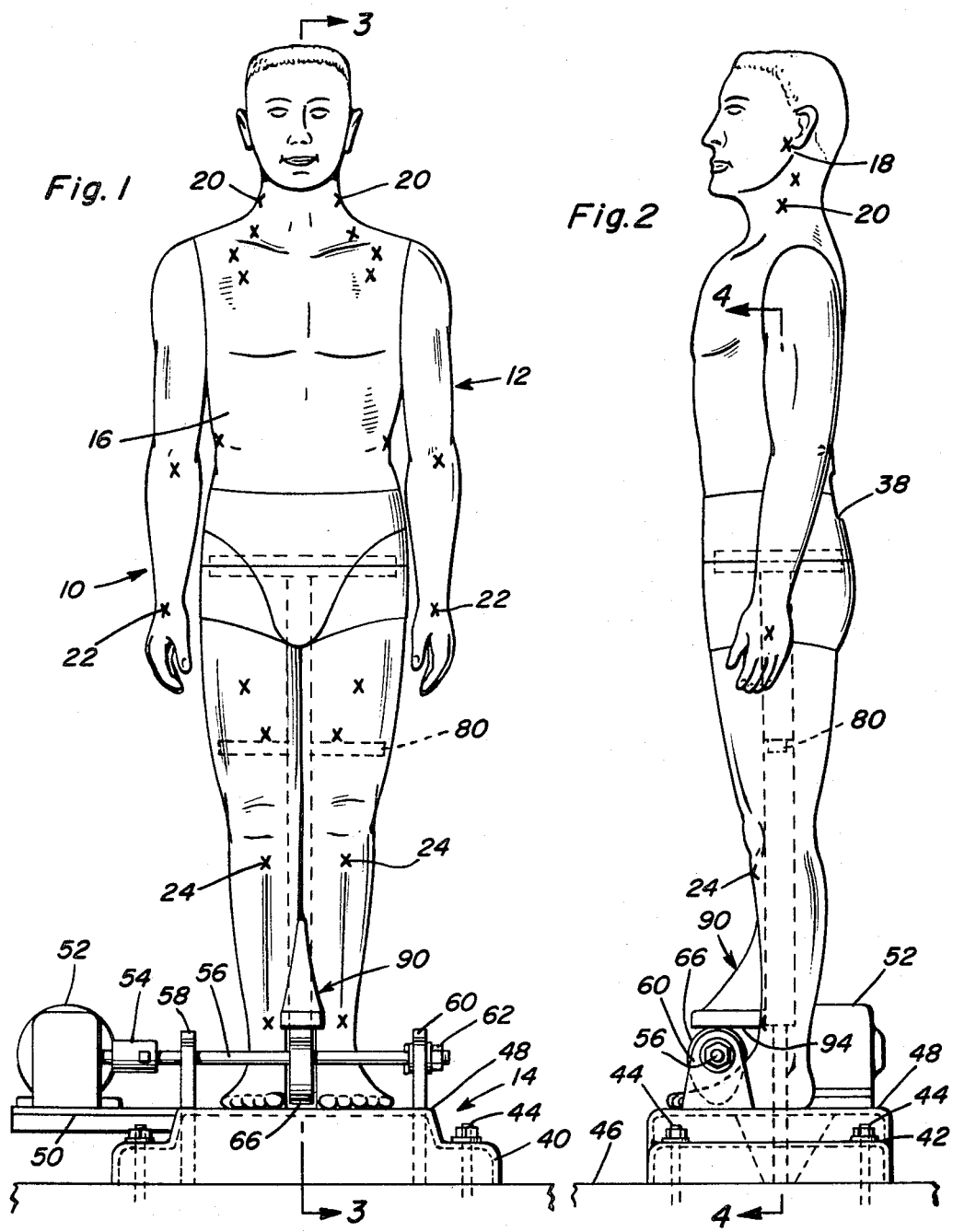

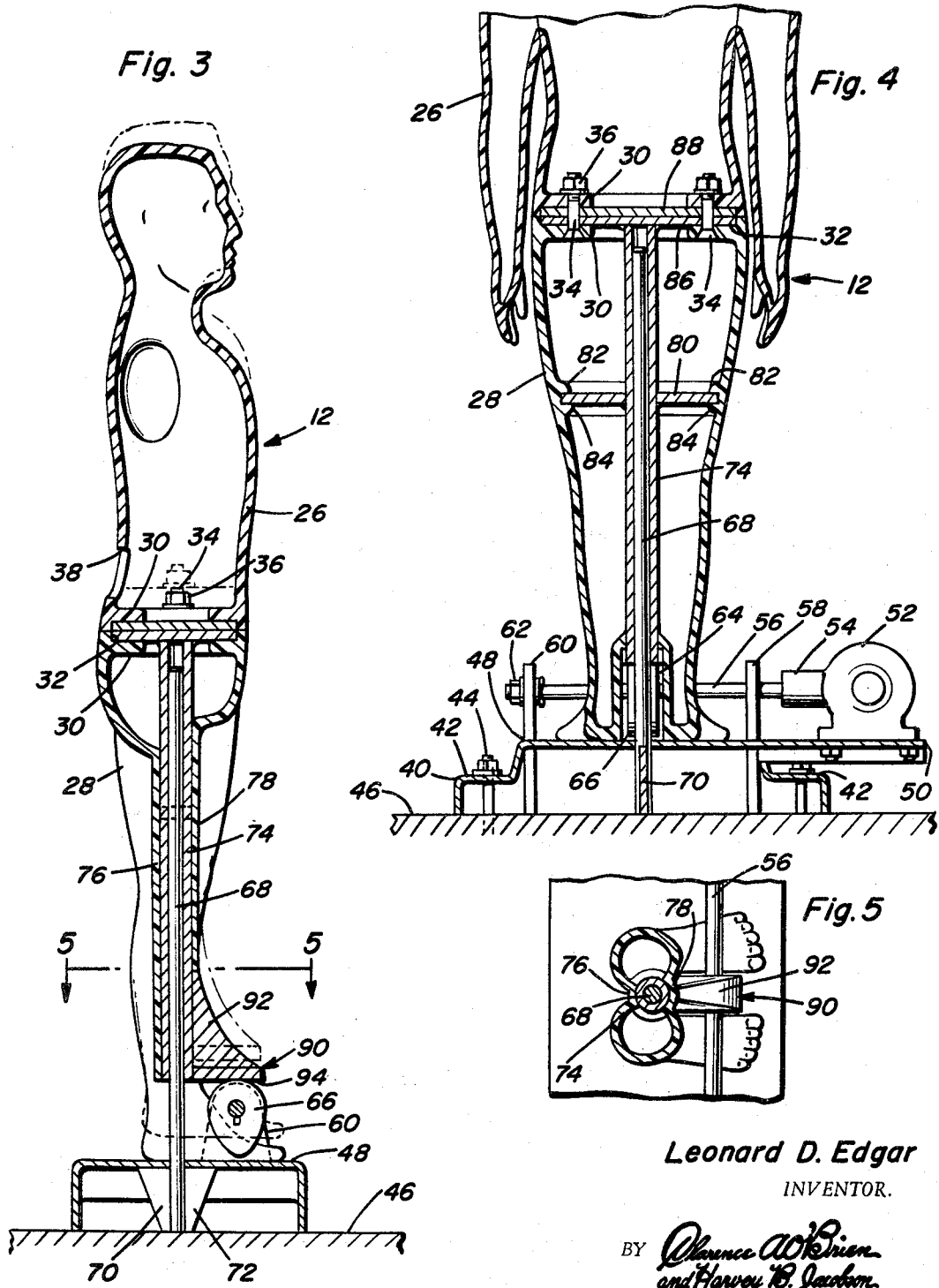

This invention relates generally to a self-defense practice device and more specifically to a vertically movable manikin or dummy of human shape, having certain vital and vulnerable body parts marked thereon in order to provide realistic targets for practice in self-defense such as, for example, for karate or judo practice.

It is an object of the instant invention to provide a self-defense practice dummy or manikin having a human figure suitable for use either by the military or by civilians for realistic practice or training in the various self-defense arts such as karate or judo.

In accordance with the above object, it is a further object of the present invention to provide a dummy having nerve centers and/or pressure points clearly marked thereon to provide practice centers for hitting the mark as in karate, judo or other manual self-defense arts.

It is a further object of the present invention to provide a practice dummy of the character described which is substantially sturdy in construction and inexpensive to manufacture.

It is another object of the present invention to provide a self-defense practice dummy of the character described including novel electrically operated camming means for vertical oscillation of the dummy thereby providing life-like practice on a moving, human target.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front elevational view of the practice dummy comprising the present invention;

FIGURE 2 is a side elevational view of the practice dummy illustrated in FIGURE 1;

FIGURE 3 is a vertical sectional view taken substantially on the plane of the line 3—3 of FIGURE 1;

FIGURE 4 is a partial vertical sectional view taken substantially on the plane of the line 4—4 of FIGURE 2; and FIGURE 5 is a partial horizontal sectional view taken substantially on the plane of the line 5—5 of FIGURE 3.

Referring now more specifically to the drawings, reference numeral 10 generally denotes the self-defense practice device comprising the present invention. The practice device 10 includes a human shaped manikin or dummy 12 mounted for vertical oscillation on a base 14.

The manikin or dummy 12 is preferably molded, cast or otherwise formed from a suitable substantially wear-resistant, resilient and durable material such as rubber, plastic or the like. It will be observed in FIGURES 1 and 2, for example, that the manikin or dummy 12 is completely human in form, including the usual human torso 16 as well as the various body appendages. As will be further observed in FIGURES 1 and 2, the dummy 12 has clearly marked thereon the various nerve centers and pressure points which are normally present in a human being and which, if struck in a suitably rapid and forceful manner will produce temporary disability, extreme pain or temporary paralysis or unconsciousness. Thus, the mark 18, for example, is located in front of the ear opening, the marks 20 are located at the neck muscles, the marks 22 are located at the wrist joints, and the marks 24 are located at the shin bone areas. It will be appreciated that, as is conventional in the karate and judo arts of self-defense, a sudden striking of these as well as various other marked nerve centers or pressure points will cause the person who has been struck to be rendered substantially helpless and thus will enable the person practicing such self-defense arts to quite effectively protect himself. It will be appreciated, therefore, that inasmuch as these self-defense arts are extremely useful not only to the military but also to civilians desiring to be able to protect themselves without the necessity of carrying firearms or other implements, it is important to provide for practice on a realistic life-like target such as a moving, human form. This sort of device is especially desirable inasmuch as there is a substantial possibility of injury during practice when a live target is utilized, as is common in the practice of karate or judo, even though the person normally does not complete the striking blow. Further, the use of the instant invention will allow the person practicing to complete his blows.

Referring now to FIGURES 3 and 4, it will be observed that the dummy or manikin 12 is formed in upper and lower portions 26 and 28 respectively, each of which is substantially hollow, and each of which has an inwardly extending flanged portion 30 closely adjacent one end thereof. Thus, by referring to FIGURES 3 and 4, it will be observed that the flanged portions 30 of the upper and lower portions 26 and 28 provide, when the upper and lower portions are mated, a chamber 32 therebetween. The upper and lower portions 26 and 28 of the manikin or dummy 12 are held together by a plurality of bolts 34 having the nuts 36 threadedly received on the upper ends thereof, the bolts extending through the flanges 30 and the chamber 32. Further, it will be seen in FIGURES 2 and 3 in particular that the upper portion 26 of the manikin 12 has a substantially rectangular opening 38 in the rear side thereof to provide access to the bolts and nuts 34 and 36 for mounting or demounting the upper body portion 26 on the lower body portion 28.

The base 14 upon which the manikin 12 is mounted comprises a hollow downwardly opening base member 40 which includes the shoulder portions 42 thereon through which mounting bolts 44 extend to fasten the base member 40 to a substantially flat supporting surface such as the floor or ground 46. The base member 40 further includes an uppermost substantially flat portion 48 between the shoulders 42 on which the manikin 12 rests when the manikin is in its lowermost position. The flat portion 48 includes a lateral extension 50 on which is mounted a conventional electric motor 52.

The electric motor 52 includes a power output drive coupling member 54 thereon on which is drivingly mounted a camshaft 56. The camshaft 56 is preferably an elongate solid cylindrical bar of suitable metallic material and is rotatably supported in a pair of bearing shoulders 58 and 60 and retained therein by the connecting means 62. The bearing support shoulders 58 and 60 are mounted in parallel spaced apart upright position on the base member 40 and include suitable and conventional journaling means providing for the rotation of shaft 56 therein.

Fixedly mounted on the shaft 56 in the opening 64 provided between the feet and legs of the manikin 12 is a cam 66 which cam 66 is shaped to impart vertical oscillating motion to a cam follower in engagement with the outer periphery of the cam as the cam is rotated.

Referring again to FIGURES 3 and 4, it will be observed that a vertical stationary solid cylindrical post or support 68 is mounted in the base member 40 and has a pair of laterally extending ground engaging legs 70 and 72 at the lower end thereof to help stabilize and mount the post 68. Mounted on the post 68 and vertically slidable thereon is a reciprocating member 74 which is a hollow cylindrical sleeve fitting about the post 68. It will be observed, in FIGURE 5 for example, that the post 68 as well as the sleeve 74 are disposed entirely within the manikin 12, the legs of the manikin being closed by the portions 76 and 78 around the sleeve 74. Fixedly mounted on the sleeve 74 and extending substantially perpendicularly thereto is a lower cross-supporting member 80 which extends into engagement with a pair of lips 82 and 84 on each internal side of the manikin legs in order to support the manikin on the sleeve 74 and provide lateral stability for the manikin in its mounting on the sleeve 74. Mounted at the upper end of the sleeve 74 and lying in the chamber 32 is an upper cross-supporting member 86 which, in conjunction with another supporting member 88 also retained in the chamber 32 by the fastening bolt 34, rigidly fasten the manikin 12 on the sleeve 74. Thus, when the sleeve 74 is moved vertically on the post 68 the manikin 12 will be carried therewith.

Mounted on the front side of the sleeve 74 and extending through an opening in the portion 78 of the manikin, is a cam follower member generally denoted by reference numeral 90, which cam follower includes an upper portion 92 mounted on the sleeve 74 and a lower flat face 94 which comprises a cam follower in constant contact with the cam member 66. Thus, as will be observed in FIGURE 3, for example, when the cam member 66 is rotated upon rotation of the shaft 56 by the motor 52, vertical rectilinear oscillating movement will be imparted to the cam follower member 90 and hence to the sleeve 74 and to the manikin 12 mounted on the sleeve. The manikin 12 will thereby be moved vertically between the position illustrated by lines in full and the position illustrated by lines in ghost in FIGURE 3. Therefore, it will be apparent that the vertical oscillating movement of the manikin 12 will provide life-like practice for karate or judo or other manual type self-defense art on a moving, human-like target.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A self-defense practice device comprising a base, a stationary upright support on said base, sleeve means slidably received on said upright support and vertically movable with respect to said base, a practice dummy in the form of a human-like manikin in upright posture, means on said sleeve means supporting said manikin thereon and maintaining said manikin in upright posture, power means on said base, shaft means rotatably mounted on said base and rotatably driven by said power means, cam means on said shaft means, and a cam follower means on said sleeve means in constant contact with said cam means whereby rotation of said shaft means will inpart vertical oscillating movement to said sleeve means and hence to said practice dummy, and means on said manikin indicating the various nerve centers and pressure points normally occurring in a human body, whereby movable practice centers are provided for the practice of manual self-defense.

2. A self-defense practice device comprising a base, a stationary upright support on said base, sleeve means slidably received on said upright support and vertically movable with respect to said base, means on said base for vertically oscillating said sleeve means on said upright support, and a practice dummy mounted on said sleeve means wherein said upright support comprises a vertically oriented cylindrical rod mounted on said base, said sleeve means comprising a hollow cylindrical sleeve member slidably mounted on said rod, first and second parallel spaced apart cross-supporting members on said sleeve member, said practice dummy being mounted on said first and second cross-supporting members, said oscillating means comprising power means on said base, said power means including a rotatable power output shaft, cam means mounted on said power output shaft, cam follower means mounted on said sleeve means and in engagement with said cam means whereby rotation of said power output shaft will cause said sleeve means and hence said dummy to oscillate vertically on said post.

References Cited

UNITED STATES PATENTS

| 1,685,495 | 9/1928 | Latz | 272—76 |
| 1,773,617 | 8/1930 | Fonda | 46—138 |
| 2,909,370 | 10/1959 | Fortney | 272—76 |
| 3,250,533 | 5/1966 | Nicholson | 272—76 |

RICHARD C. PINKHAM, *Primary Examiner.*